Patented May 20, 1952

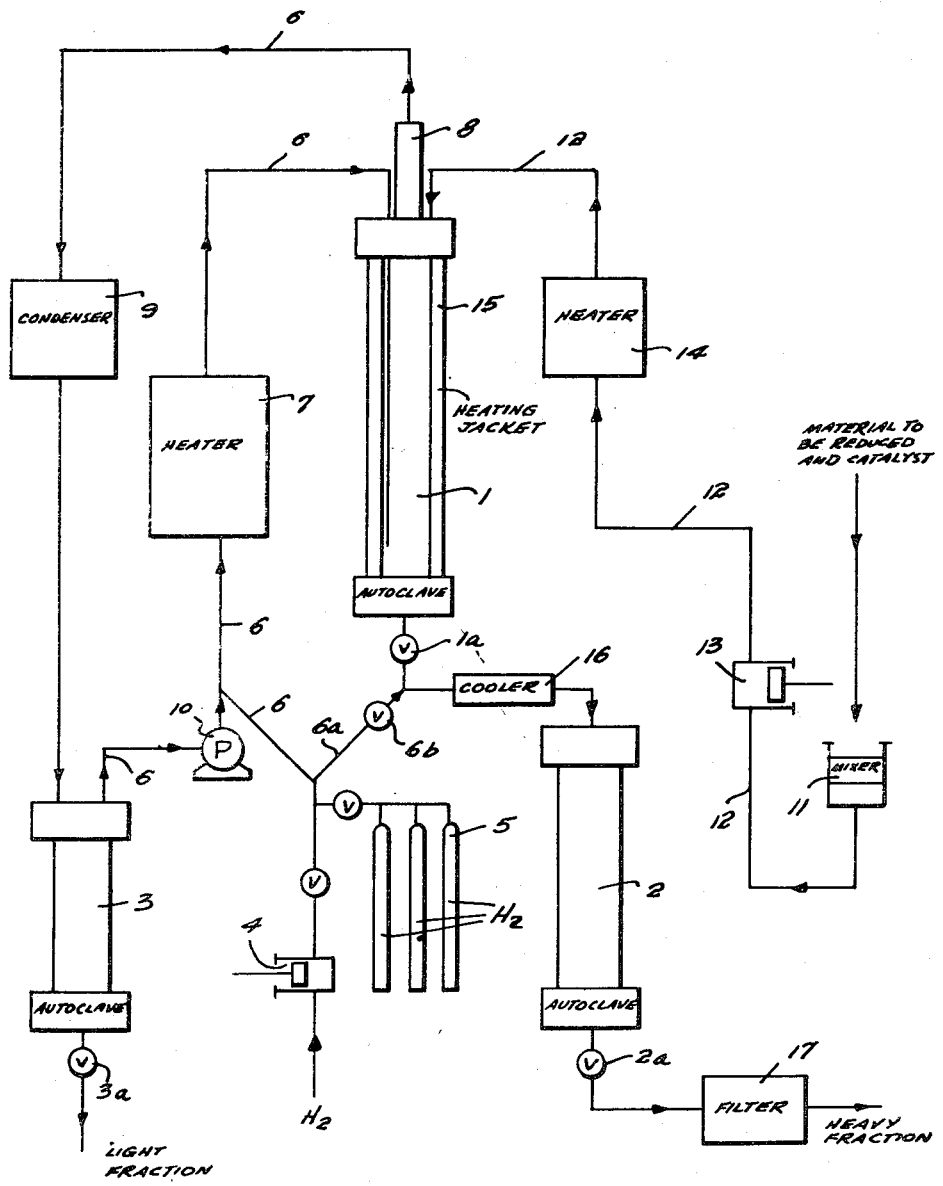

2,597,074

UNITED STATES PATENT OFFICE 2,597,074

PROCESS FOR REDUCING ORGANIC COMPOUNDS BY HYDROGENATION

Ettore De Bartholomaeis, Milan, Italy, and Vittorio De Nora, Zurich, Switzerland; said De Bartholomaeis assignor to said De Nora Application May 22, 1948, Serial No. 28,604

11 Claims. (Cl. 260—638)

This invention relates to improvements in the production of higher molecular alcohols and other hydrogenation products by the reaction of hydrogen or gases containing hydrogen with fatty or other organic materials under high pressures and temperatures in the presence of a catalyst. The process and apparatus are particularly adapted for the hydrogenation of mixed fatty acid materials of low and high molecular weight such as are found in natural fats and oils.

The hydrogenation of fatty materials and other organic substances in the presence of catalysts is a common reaction used in a number of industrial operations. The hydrogen gas reacts rapidly at the surface of the catalyst and for each field of application there are conditions of temperature and pressure which are especially favorable. In some fields of use, a combination treatment with hydrogen and carbon monoxide or hydrogen with other gases is employed, as for example, in the process of the patent to Roelen, No. 2,327,066, granted August 17, 1943.

In the hydrogenation of fatty acids or fatty acid esters or glycerides or other carboxylic acid materials, the hydrogen reacts at the carboxylic group, yielding a corresponding alcohol or mixture of alcohols. Likewise, the treatment of olefines with both hydrogen and carbon monoxide together yields alcohols. Double bonds in raw material can be hydrogenated at the same time the carboxylic group is converted, but the reaction can be made to proceed in such a way that the double bonds remain unchanged.

Broadly considered, the invention is applicable in general to the treatment of any materials heretofore capable of being reduced by known hydrogenation processes under elevated temperatures and pressures. Examples of raw material which may be reduced by the present process include coconut oil, palm kernel oil, spermaceti, sperm oil, beeswax, linseed oil, cottonseed oil, tallow, stearin, olein, colophony and any carboxylic acid or mixtures of the same derived therefrom. Carboxylic acids from other sources may also be treated, as for example, naphthenic acids. Other processes to which the process is applicable include the reaction of petroleum derivatives or fractions from the Fischer-Tropsch process. Each of the above reduction reactions is carried out in an autoclave in which temperature and hydrogen pressure conditions are maintained at predetermined desirable levels. According to present industrial practice, when the reaction in the autoclave is complete, the final product containing the catalyst distributed therethrough is discharged and fresh raw material is charged into the autoclave together with its catalyst, whereupon fresh hydrogen or hydrogen mixed with other gases is introduced.

These various operations as now practiced are a drawback to the industrial application of hydrogenation, because the autoclave is charged and discharged in each operation and the hydrogen pressure and temperature within the autoclave must be brought back to that required for the reaction. Attempts have been made to operate the process continuously, but the complications of continuous hydrogenation have not made the continuous process economical, and such process sometimes gives origin to products which are not uniform, due to the difficulty in controlling the operation and the activity of the catalyst.

We have now provided a new process and apparatus for catalytic hydrogenations, by which it is possible not only to obtain a rapid repetition of the batch hydrogenation, but also to have the hydrogenation reaction take place more rapidly and uniformly. This substantial advantage has been accomplished by maintaining the reaction autoclave always under operating conditions of hydrogen pressure and temperature, and by charging the raw material and discharging the products without changing appreciably the pressure or the temperature in the autoclave.

A further improvement has been realized by providing for a continuous hydrogen circulation through the reaction autoclave during the hydrogenation process. This step accomplishes not only stirring and mixing of the substances involved in the reaction, but also permits the elimination of water and also reduction products volatile at the temperature of the autoclave.

The reduction of the carboxylic radical of an acid or fatty acid ester or glyceride to alcohol may be represented by the following equation:

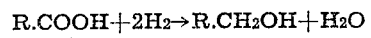

$$R.COOH + 2H_2 \rightarrow R.CH_2OH + H_2O$$

This conversion can be considered as an equilibrium reaction and therefore governed by the mass-action law. The elimination of water will therefore further the production of alcohol. When the reduction of a mixture of acids is accomplished according to conventional procedure, the more volatile alcohols and water produced remain in the vapor phase in the reaction autoclave and produce a partial vapor pressure which diminishes the hydrogen pressure. This is a disadvantage, for the reaction is slowed up.

A valuable embodiment of the present invention applicable to the treatment of organic substances leading to the production of reaction products of mixed volatility involves the use of heat and hydrogen pressure conditions adapted to vaporize the more volatile reaction products and the conduction of hydrogen into and through the reacting mass in such manner as to agitate the mass and assist in the removal of the vapors of the more volatile reduction products and also water vapors if the same be formed.

The removal of the water of reaction and the volatile products of the reaction causes the equilibrium to be displaced and to shift toward the formation of alcohols or other hydrogenation products being produced and the reaction proceeds at a more rapid rate.

Another advantage of this procedure is that the alcohol mixture which is produced is at once fractionated by this distillation or removal of volatile constituents and water in the hydrogen stream. The heavier fraction or alcohols of high molecular weight flowed from the autoclave may for some purposes be used directly without further fractionation.

The process of the present invention may be effectively carried out in an apparatus system including three autoclaves or pressure vessels, the first of which is for carrying out the reaction at elevated temperatures and the other two of which serve for the removal of the reaction products from said first autoclave while the said vessel is maintained under hydrogen pressure. One autoclave is for the removal of the lighter alcohols or other more volatile reaction products and it is connected in a circuit for recycling hydrogen gases, the said circuit including a condenser serving to liquify the said more volatile constituents and water, thereby leaving free hydrogen gas for return to the reaction autoclave. The circuit for the return of the separated hydrogen includes a pump for forcing the hydrogen through the system, and a heater for raising the temperature of the hydrogen to a desired level or to that employed in the reaction autoclave.

A dephlegmator is preferably mounted on top of the reaction autoclave in order to fractionate the alcohols or other reaction products vaporized during the reduction reaction, the condensed portion of which flows back into the reacting mass in the reaction autoclave.

Connected to the reaction autoclave, there is an inlet conduit for introducing the raw material to be reduced, in a hot condition ready or substantially ready for immediate reaction with the hydrogen in the presence of the catalyst which is introduced preferably along with the raw material.

Hereinafter the process is described with reference to the reduction of a mixture of fatty acids obtained by splitting coconut oil. This same procedure, however, can be used in any hydrogenation process or in any process involving reactions of hydrogen and other gases with liquids at high pressure and temperature, or in any hydrogenation process in which the elimination of water and products in vapor form displace the reaction in the desired direction.

The mixture of coconut oil fatty acids is treated at a hydrogen pressure of about 200 atmospheres, at a temperature of about 300° C. in the presence of a catalyst such as Cu—Cr bases or any suitable copper containing catalyst. By circulating the hydrogen, under the conditions described above, the acids are not only completely reduced but the mixture of alcohols obtained, having 6 to 18 atoms of carbon, is fractionated by the removal of the lower molecular alcohols in the hydrogen stream, leaving the heavier alcohols in the reaction autoclave.

The invention may be better understood by reference to the accompanying drawing wherein the apparatus and process are schematically illustrated. In the drawing, there are shown three autoclaves, the reaction autoclave 1, the discharge autoclave 2 for receiving the heavier reduction products and the autoclave 3 for the collection of the more volatile reduction products and the water of reaction, if any.

The hydrogen or hydrogen-containing gas is introduced into the system by means of a compressor 4 or by means of one or more hydrogen storage tanks or bottles 5. This gas flows through the conduit 6, through the heater 7 and into the reaction autoclave 1 where it is discharged substantially at the bottom thereof. The resulting bubbling causes agitation of the liquid reaction mass and causes more uniform and thorough contact between the reactants. The hydrogen in the conduit 6 is maintained under a high pressure as from 20 to 300 atmospheres or more and is raised to the desired reaction temperature in its passage through the heater 7.

The part of the hydrogen gas not absorbed in the reaction mass in the autoclave, in admixture with volatilized constituents of the reaction mass and water vapor, flows out of the top of the autoclave into the dephlegmator 8 from whence the hydrogen, the lighter portion of the volatilized constituents and the water vapor flow to the condenser 9 wherein the said vapors are cooled to a temperature at which the water and the lighter alcohols or other volatile constituents are cooled and liquefied. The condenser liquids together with the hydrogen flow from the condenser 9 to the discharge autoclave 3 wherein the liquids settle to the bottom and from which the hydrogen flows out of the top through the line 6 to the pump 10 from whence it is again introduced into the line leading to the heater 7 and to the main reaction autoclave 1.

Inasmuch as the hydrogen in the entire hydrogen circuit is maintained at a constant reactant pressure, the pump 10 operates to keep the hydrogen in circulation at a balanced pressure and need only overcome the resistance in the line 6 and rest of the system.

Periodically the valve 3a in the line leading from the autoclave 3 is opened to discharge the condensate which has collected in the autoclave 3 and when hydrogen begins to flow from the line the valve 3a is closed. As the volume of the condensate is not very large, the discharge of the condensate does not materially lower the hydrogen or other gas pressure in the line 6 and whatever lowering of pressure takes place is immediately made up by the hydrogen coming in under pressure from the compressor 4 or the storage bottles 5.

The fatty acids or other liquids undergoing hydrogenation are mixed with the desired catalyst in the catalyst mixer 11, which is preferably a homogenizing colloid mill, and pumped into the line 12 by an injector pump 13 having sufficient pressure to overcome the hydrogenation pressure. From the pump 13 the liquid containing the catalyst flows into and through a heater 14 where it is heated to the desired reaction temperature and from which it flows into the reaction autoclave 1. The pump 13 is preferably of a proportioning type so that a certain number of revolutions or minutes of operation will fill the autoclave to the desired height although any suitable measurement of the degree of filling of the autoclave may be used.

When the autoclave 1 has been filled to the desired height further introduction of liquid material is stopped and the hydrogen or gas circulation through the autoclave is continued until the reaction is completed. The autoclave 1 is maintained at the desired reaction temperature at all times by a suitable resistance or other type of heater or heating jacket 15, and may be surrounded by an insulating jacket to prevent heat losses.

During the hydrogenation reaction any of the heavier volatile products which may be carried out of the autoclave 1 by the gas stream will be condensed in the dephlegmator 8 and returned to the autoclave 1.

When the reaction is completed the valve 1a at the base of the autoclave 1 is opened and the reaction products are discharge through the cooler 16 into the discharge autoclave 2. When the autoclave 1 has been discharged the valve 1a is closed and a new charge pumped into the autoclave 1.

To discharge the reaction product from the autoclave 2 the valve 6b in the hydrogen line 6a is closed, the valve 2a at the bottom of the autoclave is opened and the liquid is allowed to flow out. As soon as the liquid has been discharged from the autoclave 2, the valve 2a is closed.

From the discharge autoclave 2 the discharged reaction products flow to a filter 17 where the reaction products are separated from the catalyst.

While our new process and apparatus has been described with particular reference to the hydrogenation of fatty acids, it will be understood that the apparatus may be used for other reactions hereinbefore described and that various modifications and changes may be made in the specific illustration without departing from the spirit of our invention or the scope of the appended claims.

We claim:

1. In batch-wise processes for the catalytic hydrogenation of fatty materials under heat and hydrogen pressure the improvement which comprises, maintaining the temperature and the hydrogen pressure in the reaction zone at operating levels between runs as well as during the runs, and continuously during each run introducing hydrogen gases in excess into and through the reaction zone, vaporizing volatile reduction products from the reaction mass while leaving reduced fatty materials in liquid form in the reaction zone, removing the resulting vapors from the reaction zone in admixture with unabsorbed hydrogen gases, condensing and removing the volatile reduction products from the mixture before reintroducing the separated hydrogen again into the reaction zone and when the hydrogenation reaction has gone to completion flowing the reduced fatty materials from the reaction zone while maintaining the same under the hydrogen pressure employed during the reaction.

2. In batch-wise reduction processes for hydrogenating organic materials under heat and hydrogen pressure the improvement which comprises, maintaining the temperature and the hydrogen pressure in the reaction zone at operating levels between runs as well as during the runs, and continuously during each run introducing hydrogen gases into the reaction zone, vaporizing a portion of the reduction products, fractionating the same, returning a condensed higher boiling fraction to the reaction zone containing the remainder of the higher boiling fraction in liquid form, removing the vapors of the lower boiling fraction from the fractionation zone together with unabsorbed hydrogen gases, condensing and removing said reduction products from the mixture of the same with hydrogen gases before reintroducing the latter into the reaction zone and when the hydrogenation reaction has gone to completion, flowing the liquid reduction products from the reaction zone while maintaining the same under temperature and pressure conditions prevailing during the reduction process.

3. In the catalytic reduction of fatty acid materials for the production of alcohols involving treatment under heat and hydrogen pressure the improvement which comprises, flowing such materials into and removing alcohols in liquid form from the reaction zone while the temperature and hydrogen pressure in the reaction zone are maintained at operating levels continuously passing hydrogen gases through the reaction mass in the reaction zone, continuously separating the hydrogen gas, water and volatile reaction products from the liquid reaction products in the reaction zone, condensing and returning to the liquid reaction products in the reaction zone the volatilized products which condense near the temperature of the reaction zone, removing the hydrogen gas, water and still volatilized reaction products from the reaction zone, cooling and condensing the water and remaining volatilized reaction products and separating the same from the hydrogen gas, and reheating and recirculating the hydrogen gas through the liquid material in the reaction zone, while maintaining the reduction pressure in the reaction zone and on the recirculating hydrogen.

4. In the catalytic reduction of mixed fatty acid material of both low and high molecular weight in processes involving heat and hydrogen pressure the improvement which comprises, maintaining the temperature and the hydrogen pressure in the reaction zone at a level which not only effects reduction of the fatty acid material but also volatilizes low molecular weight reduction products from the higher molecular weight reduction products, continuously introducing the hydrogen in substantial excess into the reacting mass, continuously removing unabsorbed hydrogen gases together with vapors of the low molecular reduction products from the reaction zone, flowing a higher molecular weight reduction product in liquid form from the reaction zone only after the reduction reaction is completed and maintaining the temperature and the hydrogen pressure in the reaction zone at operating levels during the withdrawal of the liquid reduction product as well as during replenishment of the supply of fatty acid material in the reaction zone.

5. In batch-wise catalytic reduction of mixed fatty acid material of both low and high molecular weight in processes involving heat and hydrogen pressure the improvement which comprises, maintaining the temperature and the hydrogen pressure in the reaction zone at a level which not only effects reduction of the fatty acid material, but also volatilizes low molecular weight reduction products from the higher molecular weight reduction products, continuously introducing hydrogen in substantial excess into the reacting mass, continuously removing unabsorbed hydrogen gases together with vapors of the low molecular reduction products from the reaction zone flowing a higher molecular weight reduction product in liquid form from the reaction zone only after the reduction reaction is complete and maintaining the temperature and the hydrogen pressure in the reaction zone at operating levels during the withdrawal of the liquid reduction products as well as during replenishment of the supply of fatty acid material in the reaction zone.

6. In batch-wise reduction of coconut oil fatty acids and other mixed fatty acid materials of low and high molecular weight wherein the reaction is carried out under heat and hydrogen pressure the process which comprises, subjecting a body of the fatty acid material in the presence of a catalyst to a temperature and hydrogen pressure which reduces the fatty acid material to alcohols and at the same time vaporizes a low molecular alcohol fraction produced while leaving a higher molecular alcohol fraction in liquid form in the reaction zone, continuously introducing hydrogen gases into the reaction mass in the reaction zone, continuously removing low molecular alcohol vapors and the water of reaction from the reaction zone together with unabsorbed hydrogen, removing the high molecular alcohol reduction products in liquid form from the reaction zone after the reaction has gone to completion without appreciably reducing the hydrogen pressure in the reaction zone and introducing fresh fatty acid material to be reduced already heated to a reduction temperature into the reaction zone, maintained at operating temperature levels, continuously removing the low molecular alcohols and water from the unabsorbed hydrogen and continuously returning and recirculating the unabsorbed hydrogen through the reaction zone while maintaining the recirculating hydrogen and the reaction zone under reducing pressure.

7. The method of catalytically hydrogenating fatty materials containing higher and lower molecular weight components under high pressure and temperature which comprises introducing the fatty material and catalyst into the reaction zone, maintaining the reducing pressure and temperature conditions therein, circulating hydrogen in excess through the fatty material in the reaction zone and carrying off in the stream of excess hydrogen, water and reaction products which have volatilized at the temperature and pressure in the reaction zone, while leaving the bulk of the reduced fatty material in liquid phase in the reaction zone, cooling the hydrogen stream adjacent the point of separation from the liquid fatty material and condensing and returning to the liquid fatty material those products which condense near the temperature of the reaction zone, flowing the hydrogen stream, water and volatile reaction products from the reaction zone and further cooling the hydrogen stream and stripping the volatile products from the hydrogen stream and recirculating the hydrogen through the reaction zone.

8. The method of catalytically hydrogenating fatty materials containing higher and lower molecular weight components under high pressure and temperature which comprises introducing the liquid fatty material and catalyst into a reaction zone, maintaining the reducing pressure and temperature conditions therein, circulating hydrogen in excess through the fatty material in the reaction zone at the reducing pressure, separating the excess hydrogen from the liquid reaction products and carrying off in the stream of excess hydrogen, water and reaction products which have volatilized at the temperature and pressure in the reaction zone, while leaving the bulk of the reduced fatty material in the reaction zone, stripping the volatile products from the hydrogen stream and recirculating the hydrogen through the reaction zone while maintaining the reducing pressure on the circulating hydrogen.

9. The method of catalytically hydrogenating fatty materials containing higher and lower molecular weight components under high pressure and temperature which comprises introducing the liquid fatty material, catalyst and hydrogen into the reaction zone, maintaining the hydrogenating pressure and temperature conditions therein, circulating hydrogen in excess through said fatty material in the reaction zone at the hydrogenating pressure, separating the excess hydrogen, water and volatile reaction products from the reaction products which do not volatilize at the temperature and pressure in the reaction zone and separating the excess hydrogen from the water and volatile reaction products and heating and recirculating the excess hydrogen through the reaction zone while maintaining the hydrogenating pressure in the reaction zone and on the recirculating hydrogen.

10. The method of catalytically hydrogenating fatty materials containing higher and lower molecular weight components under high pressure and temperature which comprises introducing the fatty material, catalyst and hydrogen into the reaction zone, maintaining the hydrogenating pressure and temperature conditions therein, circulating hydrogen in excess through said fatty material in the reaction zone and at the hydrogenating pressure and temperature, separating the excess hydrogen, water and volatile reaction products from the reaction products which do not volatilize at the temperature and pressure in the reaction zone, and cooling the hydrogen, water and volatile reaction products and condensing the water and volatile reaction products and separating from the excess hydrogen and heating and recirculating the excess hydrogen through the reaction zone while maintaining the hydrogenating pressure in the reaction zone and on the recirculating hydrogen until the hydrogenation of the fatty material has been completed and then discharging the liquid hydrogenated fatty material from the reacion zone.

11. In a reduction process for the hydrogenation of mixtures of high and low molecular weight fatty material under heat and hydrogen pressure, the improvement which comprises maintaining the temperature and hydrogen pressure in the reaction zone, continuously circulating hydrogen at the reduction pressure through the liquid fatty material and catalyst in the reaction zone, continuously removing vaporized reduction products and the water formed by the reaition along with excess unabsorbed hydrogen passing through the reaction zone from the liquid material in the reaction zone, condensing and returning to the liquid material in the reaction zone the volatilized material in the hydrogen which condenses near the temperature of the reaction zone, circulating the hydrogen, water and remaining volatilized reduction products from the reaction zone, cooling and condensing the water and remaining reduction products from the hydrogen, and reheating and recirculating the hydrogen back through the liquid material in the reaction zone while maintaining the reducing pressure in the reaction zone and on the recirculating hydrogen.

ETTORE DE BARTHOLOMAEIS.
VITTORIO DE NORA.

REFERENCES CITED

The following references are of record in the file of this patent:

UNITED STATES PATENTS

| Number | Name | Date |
|---|---|---|
| 1,004,035 | Kayser | Sept. 26, 1911 |
| 1,291,384 | Boyce | Jan. 14, 1919 |
| 1,311,824 | Lichtenhahn | July 29, 1919 |
| 1,333,328 | Martin | Mar. 9, 1920 |
| 1,404,709 | Allbright | Jan. 24, 1922 |
| 1,605,093 | Bouvier et al. | Nov. 2, 1926 |
| 1,839,974 | Lazier | Jan. 5, 1932 |
| 2,074,528 | Andrews et al. | Mar. 23, 1937 |
| 2,080,419 | Green | May 18, 1937 |
| 2,093,159 | Schmidt | Sept. 14, 1937 |
| 2,094,127 | Lazier | Sept. 28, 1937 |
| 2,109,844 | Lazier | Mar. 1, 1938 |
| 2,419,275 | Metzger | Apr. 22, 1947 |
| 2,451,377 | Bliss | Oct. 12, 1948 |

OTHER REFERENCES

Groggins, "Unit Processes in Organic Synthesis," Third Ed., page 548. Pub. by McGraw-Hill Book Co., New York, N. Y., 1947.